United States Patent [19]

Lamm

[11] 4,224,220
[45] Sep. 23, 1980

[54] AZO DYES

[75] Inventor: Gunther Lamm, Hassloch, Fed. Rep. of Germany

[73] Assignee: BASF Aktiengesellschaft, Ludwigshafen, Fed. Rep. of Germany

[21] Appl. No.: 1,846

[22] Filed: Jan. 8, 1979

[30] Foreign Application Priority Data

Jan. 18, 1978 [DE] Fed. Rep. of Germany ....... 2801951

[51] Int. Cl.² ............................................. C09B 31/14
[52] U.S. Cl. ................................................... 260/156
[58] Field of Search ......................................... 260/156

[56] References Cited

U.S. PATENT DOCUMENTS

| | | | |
|---|---|---|---|
| 3,817,975 | 6/1974 | Berrie | 260/156 |
| 4,087,244 | 5/1978 | Greve | 260/156 |
| 4,088,641 | 5/1978 | Hari | 260/156 |
| 4,092,308 | 5/1978 | Hegar | 260/156 X |

Primary Examiner—Paul F. Shaver
Attorney, Agent, or Firm—Oblon, Fisher, Spivak, McClelland & Maier

[57] ABSTRACT

Azo dyes of the general formula

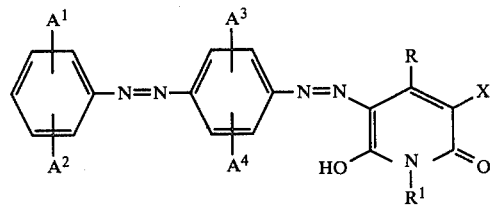

where
$A^1$ is fluorine, chlorine, bromine, cyano, trifluoromethyl, $C_1$–$C_4$-alkylsulfonyl or substituted carbamoyl,
$A^2$ is hydrogen, chlorine, bromine or methyl,
$A^3$ is hydrogen, chlorine, bromine, carboxylic acid ester, cyano, trifluoromethyl, substituted carbamoyl, methyl, ethyl, methoxy or ethoxy,
$A^4$ is hydrogen, chlorine, methoxy or ethoxy,
R is hydrogen, hydroxy, amino, methyl, ethyl or propyl,
$R^1$ is hydrogen, substituted or unsubstituted $C_1$–$C_8$-alkyl, hydroxyl or amino and
X is cyano, carbamoyl or hydrogen.

The compounds according to the invention are outstandingly suitable for dyeing synthetic fibers, especially polyesters. The high tinctorial strength and the good fastness characteristics of the dyes deserve particular mention.

9 Claims, No Drawings

AZO DYES

The present invention relates to compounds of the formula I

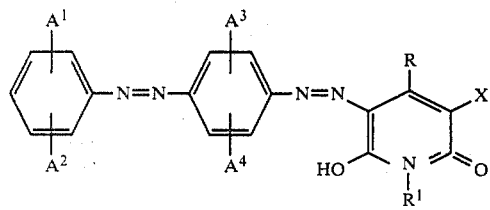

where
A$^1$ is fluorine, chlorine, bromine, cyano, trifluoromethyl, C$_1$–C$_4$-alkylsulfonyl or substituted carbamoyl,
A$^2$ is hydrogen, chlorine, bromine or methyl,
A$^3$ is hydrogen, chlorine, bromine, carboxylic acid ester, cyano, trifluoromethyl, substituted carbamoyl, methyl, ethyl, methoxy or ethoxy,
A$^4$ is hydrogen, methyl, methoxy or ethoxy,
R is hydrogen, amino, methyl, ethyl or propyl,
R$^1$ is hydrogen, substituted or unsubstituted C$_1$–C$_8$-alkyl, hydroxyl or amino and
X is cyano, carbamoyl or hydrogen.

Examples of radicals A$^1$, in addition to those already mentioned, are methylsulfonyl, ethylsulfonyl, butylsulfonyl and radicals of the formula

where R$^2$ and R$^3$ are C$_1$–C$_8$-alkyl which may or may not be substituted by C$_1$–C$_4$-alkoxy, and R$^2$ may also be hydrogen.

Specific examples of carbamyl radicals A$^1$ (and also of A$^3$) are:

CONHCH$_3$, CONHC$_2$H$_5$, CONHC$_3$H$_7$, CONHC$_4$H$_9$,

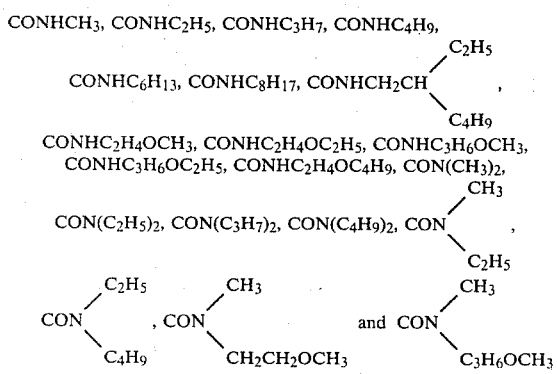

Carboxylic acid ester groups A$^3$ are in particular those of 1 to 8 carbon atoms, examples being:

COOCH$_3$, COOC$_2$H$_5$, COOC$_3$H$_7$, COOC$_4$H$_9$, COOC$_6$H$_{13}$,

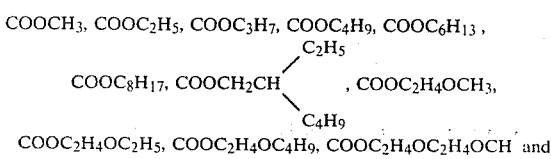

COOC$_2$H$_4$OC$_2$H$_5$, COOC$_2$H$_4$OC$_4$H$_9$, COOC$_2$H$_4$OC$_2$H$_4$OCH and COOC$_2$H$_4$OC$_2$H$_4$OC$_4$H$_9$.

Examples of substituted or unsubstituted alkyl radicals R$^1$ are alkyl radicals of 1 to 4 carbon atoms which may be substituted by C$_1$–C$_4$-alkoxy, alkanoylamino or alkoxycarbonylamino. Specific examples are: CH$_3$, C$_2$H$_5$, n- and i-C$_3$H$_7$, n- and i-C$_4$H$_9$, C$_2$H$_4$OCH$_3$, C$_2$H$_4$OC$_2$H$_5$, C$_2$H$_4$OC$_3$H$_7$, C$_2$H$_4$OC$_4$H$_9$, C$_3$H$_6$OCH$_3$, C$_3$H$_6$OC$_2$H$_5$ and C$_3$H$_6$OC$_4$H$_9$ and CH$_2$NHCOCH$_3$, CH$_2$NHCOCH$_2$H$_5$, CH$_2$NHCOC$_3$H$_7$, CONH-COOCH$_3$, CH$_2$NHCOOC$_2$H$_5$, CH$_2$NHCOOC$_4$H$_9$ and

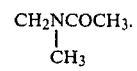

A compound of the formula I may be prepared by reacting a diazo compound of an amine of the formula II

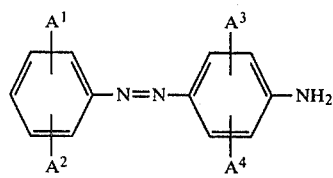

with a coupling component of the formula III

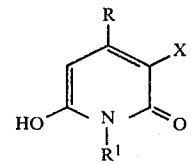

Details of the reactions may be found in the Examples, where parts and percentages are by weight, unless stated otherwise.

Compounds of particular importance are those of the formula I a

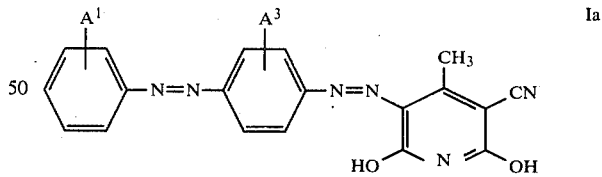

where A$^1$ and A$^3$ have the stated meanings.

The compounds of the formula I may be used for dyeing synthetic fibers, especially polyesters. They give orange to red dyeings distinguished by good fastness characteristics, eg. good lightfastness and fastness to dry heat pleating and setting. In certain cases, the tinctorial strength is very high.

EXAMPLE 1

9.3 parts of 4-chloro-4'-amino-azobenzene are dissolved in 100 parts of warm glacial acetic acid, the solution is then cooled to room temperature, 15 parts by volume of concentrated hydrochloric acid are added and the mixture is cooled to 10°–12° C. 14 parts by volume of a 23 percent strength aqueous sodium nitrite solution are then added at 10°–14° C. and the mixture is stirred for 2½ hours at 10°–15° C. After destroying excess nitrous acid with amidosulfonic acid, the diazonium salt mixture is run into a solution prepared by heating 6.0 parts of 2,6-dihydroxy-3-cyano-4-methylpyridine in 200 parts by volume of water and 4 parts of 50 percent strength sodium hydroxide solution, and then cooling to 0° C. by adding ice. During the addition of the diazo component, sodium hydroxide solution is added to the coupling mixture so as to prevent the pH from falling below 4.5.

After completion of coupling, the mixture is heated at 80°–90° C. at pH 4.5–8 and the dye which has precipitated is filtered off as soon as the heat treatment has produced the desired crystal size, and is washed salt-free. After drying, 15.3 parts of a brown powder are obtained. The dye has the formula

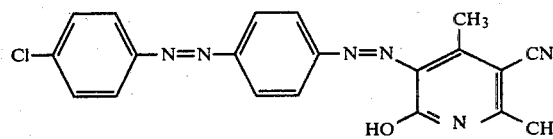

and dyes polyethylene terephthalate fabric, by the high temperature process (at 125°–140° C.), in deep orange hues having good lightfastness and fastness to dry heat pleating and setting. The dye is very economical in use.

EXAMPLE 2

8.9 parts of 4-cyano-4'-amino-azobenzene are diazotized by the method described in Example 1 and excess nitrous acid is destroyed. 6.6 parts of 1,4-dimethyl-2-hydroxy-3-cyanopyrid-6-one are dissolved in 200 parts by volume of water and 4 parts of 50 percent strength sodium hydroxide solution and are cooled to 0° C. with ice, after which the diazonium salt mixture is run in slowly, with thorough stirring, whilst keeping the pH at from 4.5 to about 9 by simultaneous addition of dilute sodium hydroxide solution. The coupling is completed rapidly. The suspension is heated to 70°–80° C. and is kept at this temperature for some time, and the dye which has precipitated is filtered off hot. After washing and drying, 15.5 parts of a reddish brown powder of the formula

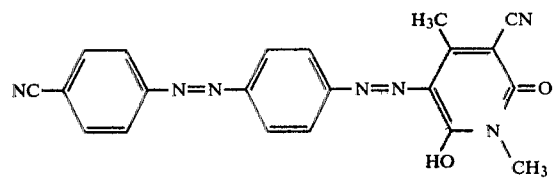

are obtained; this product dyes polyethylene terephthalate in orange hues having good lightfastness and fastness to dry heat pleating and setting.

EXAMPLE 3

9.8 parts of 4-chloro-3'-methyl-4'-amino-azobenzene are stirred into 50 parts by volume of glacial acetic acid. 2 parts of concentrated sulfuric acid are added, followed, at 10°–15° C., by 14 parts of a 42 percent strength nitrosylsulfuric acid solution. The diazotization mixture is stirred for 1½ hours at 15° C. and after destroying the excess nitrous acid the mixture is combined with a solution of 5.5 parts of 2,6-dihydroxynicotinonitrile in 200 parts by volume of water and 4 parts of 50 percent strength sodium hydroxide solution, using a procedure similar to that described in Examples 1 and 2. After isolating the product in the conventional manner, 15.2 parts of a reddish brown powder of the formula

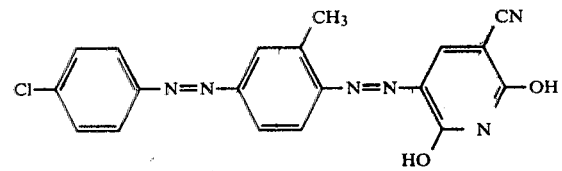

are obtained; this product dyes polyethylene terephthalate fabric in reddish orange hues which are lightfast and fast to dry heat pleating and setting.

The dyes characterized in the Table below by specifying the substituents are also obtained by methods similar to that described above.

TABLE 1

| No. | $A^1$ | $A^2$ | $A^3$ | $R^1$ | Hue |
|---|---|---|---|---|---|
| 4 | Cl | H | H | $CH_3$ | orange |
| 5 | " | " | " | $C_2H_5$ | " |
| 6 | " | " | " | $C_3H_7(n)$ | " |
| 7 | " | " | " | $C_4H_9(n)$ | " |
| 8 | " | " | " | $C_4H_9(i)$ | " |
| 9 | " | " | " | $CH_2CH_2OCH_3$ | " |
| 10 | " | " | " | $CH_2CH_2CH_2OCH_3$ | " |
| 11 | " | " | $CH_3$ | $CH_3$ | " |
| 12 | " | Cl | H | $C_4H_9(n)$ | " |
| 13 | " | " | $CH_3$ | " | reddish orange |
| 14 | $CH_3CH_2CH_2CH_2SO_2—$ | H | H | $CH_3$ | orange |
| 15 | " | " | $CH_3$ | " | reddish orange |
| 16 | $CH_3CH_2CH_2CH_2SO_2—$ | H | $CH_3$ | $C_2H_5$ | reddish orange |

TABLE 1-continued

Structure:
$A^1$-(phenyl with $A^2$)-N=N-(phenyl with $A^3$)-N=N-(pyridone with $H_3C$, $CN$, $=O$, $HO$, $N-R^1$)

| No. | $A^1$ | $A^2$ | $A^3$ | $R^1$ | Hue |
|---|---|---|---|---|---|
| 17 | " | " | " | $C_4H_9(n)$ | reddish orange |
| 18 | " | Cl | " | " | red |
| 19 | $\begin{matrix}C_2H_5\\ \diagdown\\ N-CO-\\ \diagup\\ C_2H_5\end{matrix}$ | H | H | H | orange |
| 20 | " | " | " | $CH_3$ | " |
| 21 | " | " | " | $C_2H_5$ | " |
| 22 | " | " | Cl | H | reddish orange |
| 23 | " | " | " | $CH_3$ | reddish orange |
| 24 | " | " | " | $C_2H_5$ | reddish orange |
| 25 | " | " | " | $C_4H_9(n)$ | reddish orange |
| 26 | " | " | $CH_3$ | H | reddish orange |
| 27 | $\begin{matrix}C_2H_5\\ \diagdown\\ N-CO-\\ \diagup\\ C_2H_5\end{matrix}$ | H | $OCH_3$ | H | red |
| 28 | " | " | " | $CH_3$ | " |
| 29 | " | " | " | $C_2H_5$ | " |
| 30 | " | " | $COOCH_3$ | $CH_3$ | " |
| 31 | $\begin{matrix}C_2H_5\\ \diagdown\\ N-CO-\\ \diagup\\ C_2H_5\end{matrix}$ | H | $COOCH_3$ | $C_2H_5$ | " |
| 32 | " | " | $COOC_2H_5$ | H | " |
| 33 | " | " | " | $CH_3$ | " |
| 34 | " | " | " | $C_2H_5$ | " |
| 35 | " | " | " | $C_4H_9(n)$ | " |
| 36 | $C_4H_9(n)NH-CO-$ | " | H | H | orange |
| 37 | " | " | $CH_3$ | " | " |
| 38 | " | " | H | $CH_3$ | " |
| 39 | " | " | " | $C_2H_5$ | " |
| 40 | " | " | " | $C_4H_9(n)$ | " |
| 41 | " | " | $OCH_3$ | $CH_3$ | red |
| 42 | " | Cl | H | H | orange |
| 43 | $CH_3OCH_2CH_2CH_2NHCO-$ | H | " | " | " |
| 44 | " | " | " | $CH_3$ | " |
| 45 | " | " | " | $C_2H_5$ | " |
| 46 | " | " | $CH_3$ | H | " |
| 47 | $CH_3OCH_2CH_2CH_2NHCO-$ | H | $CH_3$ | $CH_3$ | " |
| 48 | " | " | " | $C_4H_9(n)$ | " |
| 49 | " | Cl | " | H | " |
| 50 | $CH_3OCH_2CH_2NHCO-$ | H | H | $C_4H_9(n)$ | " |
| 51 | " | Cl | " | " | " |
| 52 | " | " | " | $CH_3$ | " |
| 53 | " | " | " | H | " |
| 54 | " | " | $CH_3$ | " | " |
| 55 | $C_6H_{13}(n)NH-CO-$ | H | " | $CH_3$ | " |
| 56 | " | " | " | $CH_2CH_2OCH_3$ | " |
| 57 | $(i)C_8H_{17}NH-CO-$ | " | H | H | " |
| 58 | " | " | " | $CH_3$ | " |
| 59 | " | " | Cl | H | red |
| 60 | " | " | " | $CH_3$ | " |
| 61 | $C_2H_5NH-CO-$ | " | $COOC_2H_3$ | " | " |
| 62 | $C_4H_9(n)NH-CO-$ | " | " | " | " |
| 63 | Br | H | H | H | orange |
| 64 | Cl | " | Cl | $CH_2CH_2OCH_3$ | " |
| 65 | $-CH$ | " | " | $C_4H_9(n)$ | reddish orange |
| 66 | $C_4H_9(n)NH-CO-$ | Cl | " | " | reddish orange |
| 67 | $CH_3CH_2CH_2CH_2SO_2-$ | H | $CF_3$ | " | reddish orange |

TABLE 1-continued

Structure: A¹-(2,4-substituted phenyl)-N=N-(A²,A³-substituted phenyl)-N=N-(pyridone with H₃C, CN, HO, N-R¹, =O)

| No. | A¹ | A² | A³ | R¹ | Hue |
|-----|----|----|----|----|-----|
| 68 | C₂H₅\N—CO—/C₂H₅ | " | CN | CH₃ | reddish orange |
| 69 | " | " | " | H | reddish orange |
| 70 | (pyrrolidine)N—CO— | " | H | " | orange |
| 71 | " | " | " | CH₃ | " |
| 72 | C₆H₅—NHCO— | " | " | | |
| 73 | CH₃\N—CO—/CH₃ | " | " | H | " |
| 74 | " | " | " | CH₃ | " |
| 75 | " | " | CH₃ | H | reddish orange |
| 76 | " | " | H | C₄H₉(n) | orange |
| 77 | " | " | CH₃ | " | reddish orange |
| 78 | Cl | " | CON(CH₃)₂ | H | reddish orange |
| 79 | Cl | Cl | COH(CH₃)₂ | CH₃ | reddish orange |
| 80 | " | " | " | C₄H₉(n) | reddish orange |
| 81 | " | H | COH(C₂H₅)₂ | H | reddish orange |
| 82 | " | " | " | C₄H₉(n) | reddish orange |
| 83 | " | | Cl | Cl | " | reddish orange |
| 84 | H | Cl | H | H | orange |
| 85 | Cl | Cl | " | " | " |

TABLE 2

Structure: A¹-(2,4-substituted phenyl)-N=N-(A²,A³,A⁴-substituted phenyl)-N=N-(pyridone with R, X, HO, N-R¹, =O)

| No. | A¹ | A² | A³ | A⁴ | X | R | R¹ | Hue |
|-----|----|----|----|----|---|---|----|----|
| 86 | Cl | H | H | H | CN | CH₃ | H | orange |
| 87 | " | " | " | " | " | " | CH₃ | " |
| 88 | " | " | C₂H₅ | " | " | " | H | orange |
| 89 | " | Cl | H | " | " | " | CH₃ | orange |
| 90 | " | " | " | " | " | H | " | " |
| 91 | H | " | Cl | H | H | CH₃ | H | " |
| 92 | " | " | " | " | " | " | CH₃ | " |
| 93 | " | " | " | " | " | " | C₄H₉(n) | " |
| 94 | Cl | " | H | " | " | " | " | " |
| 95 | " | " | Cl | " | " | " | H | orange |
| 96 | " | H | CH₃ | Cl | CN | " | " | reddish orange |
| 97 | Cl | H | H | H | CN | C₂H₅ | H | orange |
| 98 | " | " | " | " | " | C₃H₇(n) | " | orange |
| 99 | " | " | CON(C₂H₅)₂ | " | " | CH₃ | C₂H₅ | " |

TABLE 2-continued

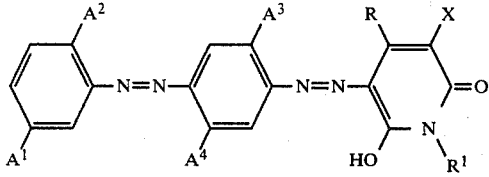

| No. | A¹ | A² | A³ | A⁴ | X | R | R¹ | Hue |
|---|---|---|---|---|---|---|---|---|
| 100 | " | " | " | " | " | $C_2H_5$ | $CH_3$ | " |
| 101 | " | " | " | Cl | " | $CH_3$ | $C_4H_9(n)$ | " |
| 102 | $CH_3(CH_2)_3SO_2-$ | Cl | " | H | " | " | " | " |
| 103 | " | " | $CH_3$ | " | " | " | " | reddish orange |
| 104 | $C_2H_5$<br>$\phantom{XX}\diagdown$<br>$\phantom{XXX}$N—CO—<br>$\phantom{XX}\diagup$<br>$C_2H_5$ | H | H | " | CN | " | H | orange |
| 105 | " | " | CN | " | H | " | $C_4H_9(n)$ | " |
| 106 | $CH_3O(CH_2)_3-NH$<br>$\phantom{XXXXXXX}\|$<br>$\phantom{XXXXXXX}CO-$ | " | H | " | CN | " | " | " |
| 107 | $CH_3O(CH_2)_3NH$<br>$\phantom{XXXXXX}\|$<br>$\phantom{XXXXXX}CO-$ | " | $CH_3$ | " | " | " | " | " |
| 108 | Cl | " | " | $CH_3$ | $CONH_2$ | " | " | " |
| 109 | " | Cl | Cl | H | " | " | H | reddish orange |
| 110 | $C_4H_9(n)$<br>$\phantom{XX}\diagdown$<br>$\phantom{XXX}$N—CO—<br>$\phantom{XX}\diagup$<br>$C_4H_9(n)$ | H | Cl | H | $CONH_2$ | $CH_3$ | $C_2H_5$ | orange |
| 111 | Br | " | H | " | CN | " | H | orange |
| 112 | Cl | " | $COOC_2H_5$ | " | " | " | $C_2H_5$ | reddish orange |
| 113 | Cl | $CH_3$ | H | H | CN | " | H | orange |
| 114 | " | H | " | " | H | " | " | yellow |
| 115 | " | $CH_3$ | " | " | CN | OH | " | " |
| 116 | " | H | " | " | " | " | $CH_3$ | " |
| 117 | " | " | " | " | " | $NH_2$ | H | " |
| 118 | " | " | " | " | " | " | $CH_3$ | " |
| 119 | " | $CH_3$ | " | " | " | " | " | " |
| 120 | " | " | " | " | " | " | H | " |

TABLE 3

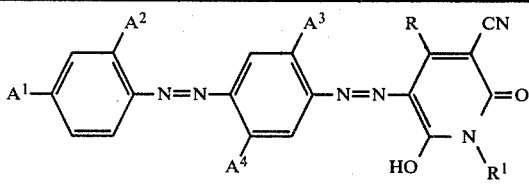

| No. | A¹ | A² | A³ | A⁴ | R | R¹ | Hue |
|---|---|---|---|---|---|---|---|
| 121 | Cl | H | H | H | $C_2H_5$ | H | orange |
| 122 | " | " | " | " | $C_3H_7(n)$ | " | " |
| 123 | " | " | $CH_3$ | $CH_3$ | $CH_3$ | $C_4H_9(n)$ | reddish orange |
| 124 | $C_2H_5$<br>$\phantom{XX}\diagdown$<br>$\phantom{XXX}$N—CO—<br>$\phantom{XX}\diagup$<br>$C_2H_5$ | " | " | " | " | " | reddish orange |
| 125 | $CH_3O(CH_2)_3NH-CO-$ | " | " | " | " | " | reddish orange |
| 126 | Cl | Cl | H | H | " | H | orange |
| 127 | " | H | $CH_3$ | Cl | " | $C_4H_9(n)$ | " |
| 128 | $CH_3(CH_2)_3SO_2-$ | H | H | H | $CH_3$ | H | " |
| 129 | $C_4H_9(n)NH-CO-$ | " | " | $CH_3$ | " | " | " |
| 130 | " | " | " | " | " | $CH_3$ | " |
| 131 | " | " | " | " | " | $C_4H_9(n)$ | " |
| 132 | Cl | Cl | $COOC_4H_9(n)$ | H | " | " | " |
| 133 | " | " | $COOC_2H_4OCH_3$ | " | " | " | " |
| 134 | " | H | $COOC_2H_4OC_2H_4OC_4H_9(n)$ | " | " | " | " |

TABLE 3-continued

| No. | $A^1$ | $A^2$ | $A^3$ | $A^4$ | R | $R^1$ | Hue |
|---|---|---|---|---|---|---|---|
| 135 | $C_2H_5$-N-CO / $C_2H_5$ | " | CN | " | " | " | reddish orange |
| 136 | " | " | " | " | " | $C_2H_5$ | reddish orange |
| 137 | Cl | " | H | " | $NH_2$ | H | yellow |
| 138 | " | " | " | " | " | $CH_3$ | " |

Table 4

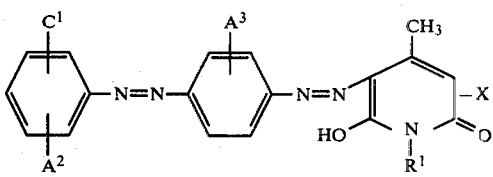

| No. | $A^1$ | $A^3$ | R | $R^1$ | X | Hue on polyester |
|---|---|---|---|---|---|---|
| 139 | H | H | $CH_3$ | H | H | golden yellow |
| 140 | " | " | H | " | " | golden yellow |
| 141 | " | $OCH_3$ | $CH_3$ | " | " | red |
| 142 | " | $CH_3$ | " | " | " | orange |
| 143 | Cl | " | " | " | " | " |
| 144 | " | " | " | " | $CONH_2$ | " |
| 145 | H | " | " | " | " | " |
| 146 | " | " | $NH_2$ | $CH_3$ | CN | yellow |
| 147 | " | $OCH_3$ | $CH_3$ | " | H | red |
| 148 | " | " | " | $C_2H_5$ | " | " |
| 149 | " | " | " | $C_3H_7$ | " | " |

I claim:

1. A dye of the formula

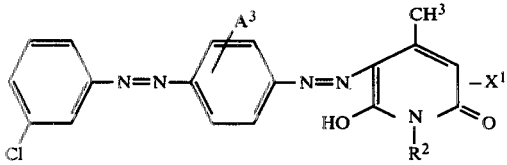

$A^2$ is hydrogen or methyl,
$A^3$ is hydrogen, methyl or ethyl,
X is hydrogen, cyano or carbamoyl and
$R^1$ is hydrogen or $C_1$- to $C_8$-alkyl.

2. A dye according to claim 1, wherein $A^2$ is hydrogen.

3. A dye according to claim 1, wherein $R^1$ is hydrogen or $C_1$- to $C_4$-alkyl.

4. A dye according to claim 1, wherein $R^1$ is hydrogen.

5. A dye according to claim 1, wherein X is hydrogen.

6. A dye according to claim 1, wherein $A^3$ is hydrogen or methyl.

7. A dye according to claim 1 of the formula

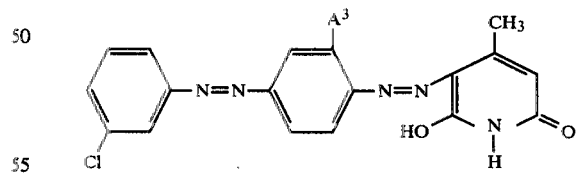

wherein
$A^3$ is hydrogen or methyl,
$R^2$ is hydrogen or $C_1$- to $C_4$-alkyl and
$X^1$ is hydrogen or cyano.

8. A dye according to claim 5, wherein $R^2$ and $X^1$ are hydrogen.

9. The dyes according to claim 1 of the formula

* * * * *